US006766863B2

(12) United States Patent
Arvidson et al.

(10) Patent No.: US 6,766,863 B2
(45) Date of Patent: Jul. 27, 2004

(54) FIRE FIGHTING FOAM INJECTION SYSTEM WITH AUTO-START FEATURE

(75) Inventors: Lawrence C. Arvidson, Andover, MN (US); Robert S. Horeck, Fridley, MN (US)

(73) Assignee: Hypro Corporation, New Brighton, MN (US)

( * ) Notice: Subject to any disclaimer, the term of this patent is extended or adjusted under 35 U.S.C. 154(b) by 103 days.

(21) Appl. No.: 10/251,038

(22) Filed: Sep. 20, 2002

(65) Prior Publication Data

US 2004/0055762 A1 Mar. 25, 2004

(51) Int. Cl.[7] ........................ A62C 35/00; A62C 27/00; A01G 27/00; G05D 11/02; G05D 11/16

(52) U.S. Cl. ............................. 169/14; 169/13; 169/15; 169/24; 239/69; 700/285

(58) Field of Search .............................. 169/14, 24, 15, 169/13; 239/69, 68, 61, 310, 318, 172; 700/285, 12, 282, 283

(56) References Cited

U.S. PATENT DOCUMENTS 5,174,383 A * 12/1992 Haugen et al. ............... 169/15
5,284,174 A * 2/1994 Norman ......................... 137/5
5,494,112 A 2/1996 Arvidson et al.
RE35,362 E 10/1996 Arvidson et al.
5,764,463 A 6/1998 Arvidson et al.
5,765,644 A 6/1998 Arvidson et al.
5,816,328 A * 10/1998 Mason et al. ................. 169/15
5,823,219 A * 10/1998 Purvis et al. .................. 137/5
5,979,564 A * 11/1999 Crabtree ....................... 169/15
6,009,953 A * 1/2000 Laskaris et al. .............. 169/13
6,684,959 B1 * 2/2004 Juidici et al. ................. 169/44

* cited by examiner

*Primary Examiner*—Gene Mancene
*Assistant Examiner*—Darren Gorman
(74) *Attorney, Agent, or Firm*—Michael Best & Friedrich LLP

(57) ABSTRACT

A fire fighting vehicle of the type having a system for introducing a liquid foam concentrate into a water delivery hose so that the percentage concentration of foamant in the mixture remains at a predetermined set value irrespective of variations in the water flow rate. The improvement provided involves the addition of an AutoStart feature whereby upon application of power to the foam control system, the system comes up in an on mode without the need for human intervention.

5 Claims, 2 Drawing Sheets

FIRE FIGHTING FOAM INJECTION SYSTEM WITH AUTO-START FEATURE

BACKGROUND OF THE INVENTION

I. Field of the Invention

This invention relates generally to fire fighting apparatus, and more particularly to a system for introducing a liquid foam concentrate into a water stream in varying amounts to maintain a predetermined percentage mixture, irrespective of variations in the flow rate of the water stream where the system is automatically conditioned upon application of electrical power.

II. Discussion of the Prior Art

In our earlier U.S. Pat. No. Re. 35,362, the contents are which are hereby incorporated by reference, as if set out in full herein, there is described a system for controlling the introduction of a liquid chemical foamant into a water stream used in fighting fires at an appropriate flow rate so that the amount of foam in the water stream is of a predetermined concentration, irrespective of variations in the water flow rate. Identified in the '362 patent as an "optional enhancement" is the inclusion of a compressed air source for projecting the foam/water mixture a greater distance as it exits a hose or water cannon. As described therein, it is important that the compressed air not be introduced into the water stream in the absence of the foam additive. Upon arriving at a fire, a human operator must start the introduction of the liquid chemical foamant by depressing an "on/off" switch on the controller module. As is explained in the '362 patent, upon depression of the on/off push button 32, the microprocessor in the controller module 26 executes an algorithm represented by the flow chart of FIG. 9 of that patent to control the introduction of foam concentrate into a water stream being pumped whereby the percentage concentration is maintained relatively constant irrespective of variations in the water flow rate as the fire fighter manipulates a hose nozzle.

It has been found advantageous to eliminate the need for a human operator to initiate operation. If either due to inattention or the excitement of the moment, a fire fighter should fail to depress the start button, air may be introduced in the water stream without the foam additive. Accordingly, it is a principal purpose of the present invention to provide a control feature that will assure that the system is in an auto-start condition at the time power is applied, obviating the need for a human operator to turn on the foam control system. The improvement to the prior art foam injection system described herein reduces the time needed to activate the foam injection system while providing all of the necessary safety interlocks to prevent untimely activation. Moreover, by implementing the present invention, only a single switch is needed in the cab of a fire-fighting vehicle thereby facilitating "pump & roll" operation of the vehicle when creating a fire brake when dealing with grass and brush fires.

SUMMARY OF THE INVENTION

The present invention provides in a fire fighting vehicle a system for introducing a liquid foam concentrate into a water stream in varying amounts to maintain a predetermined percentage mixture, irrespective of variations in water flow rates. The vehicle includes a source of electrical power for a water pump used to deliver raw water through a delivery hose. One or more foam pumps are used for delivering liquid foam concentrate from a supply tank carried by the vehicle into the delivery hose where it is mixed with raw water. Electric, hydraulic or both may be connected in driving relation to the foam pumps and a microprocessor-based controller, that is adapted to be energized from the source of electrical power, is coupled in controlling relation to the motor(s) that drives the foam pump(s) whereby the fluid flow output rate of the foam pump(s) can be varied. The present invention comprises an improvement to the above-described system. The microprocessor-based controller is programmed such that upon application of electrical power from the source to the microprocessor-based controller, the system is conditioned to introduce the liquid foam concentrate into the water stream by the foam pump(s) upon detection of raw water flow in the delivery hose. The auto start program executed by the microprocessor-based controller initially makes sure that the water pump and foam pump(s) are off and that they will be turned on only if predetermined conditions are met. Specifically, a test is made to determine whether the auto start mode is enabled and, if so, another test is made to determine whether the foam pumps are properly configured and the level of foam concentrate in the foam tank is above a predetermined level and then and only then will the software routine represented by the flow diagram of FIG. 9 of the aforereferenced Reissue U.S. Pat. No. 35,362 be called. Thus, the present invention conditions the system to inject foam concentrate into the water stream immediately upon detection that the water is being pumped and without the need for human intervention.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which.

DESCRIPTION OF THE PREFERRED EMBODIMENT

Figure 1:
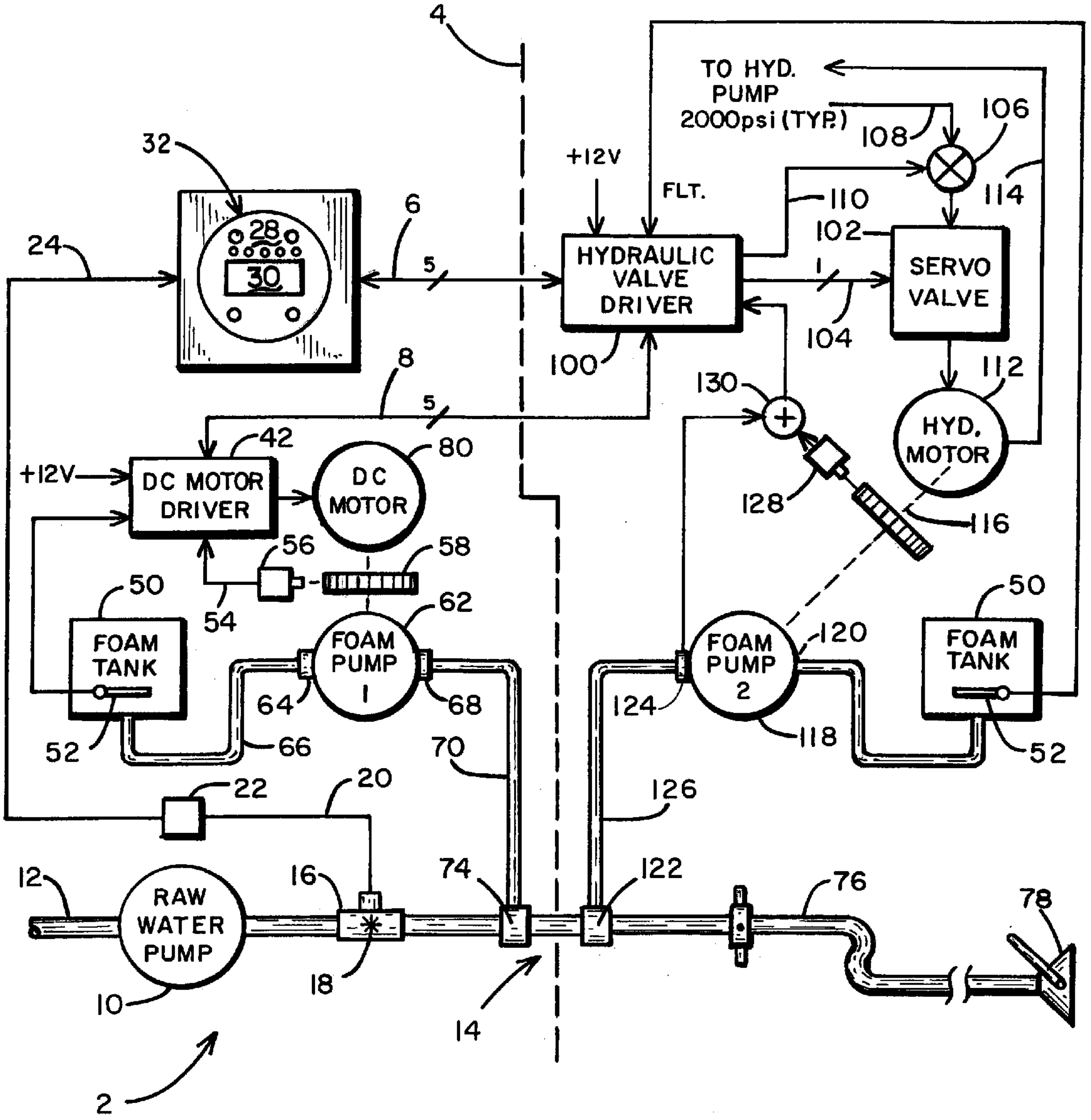
FIG. 1 is a block diagram of the foam injecting system in which the present invention finds use.

Referring to FIG. 1, there is indicated generally by numeral 2 a dual-port foam injection system that is more particularly described in our earlier U.S. Pat. No. 5,494,112. As is pointed out in that patent, the portion of the system lying to the left of the dashed line 4 is identical in all respects to the system described in the aforereferenced Arvidson et al. Reissue U.S. Pat. No. 35,362. The components to the right of the dashed line 4 depict the components that are added to greatly increase the range of water flows that can be accommodated whereby the concentration of liquid chemical foamant can be maintained. More particularly, by adding a second foam pump driven by a hydraulic motor whose speed, in turn, is controlled by the microprocessor-based controller 26, a preset concentration of liquid chemical foamant can be maintained as the raw water flow rate varies from several hundred gallons per minute down to as low as two gallons per minute. Because the construction and mode of operation of the system illustrated in FIG. 1 is fully described in the Arvidson '112 patent, it is deemed unnecessary to repeat that disclosed material herein. Those skilled in the art reading the two aforereferenced patents that have been incorporated by reference herein will have a full understanding of how the system functions once the on/off switch 32 is actuated.

The addition of the present invention to the system described in the '112 patent makes it unnecessary for fire-fighting personnel to manually activate the system by depressing the on/off toggle switch 32. The manner in which it is achieved will now be explained with the aid of the software flow diagram shown in FIG. 2. The portion of the flow chart below the dashed line is identical to that set out in FIG. 3 of the '112 patent and its functionality is fully described in that patent. The portion of the flow chart above the dotted line implements the automatic start feature constituting the improvement provided by the present invention.

Most fire-fighting vehicles in which the foam injection system of the present invention is used include an auxiliary power panel that is independent of the vehicle's engine starter circuit, thus insuring that ample battery current is available to start the vehicle's engine. The auxiliary power panel typically has its own batteries and an alternator to maintain the batteries charged so long as the vehicle's engine is running. The panel has switches for controlling lights, communications equipment and a variety of other power consuming devices found on modern fire engines. The foam injection system is also most often powered from the auxiliary supply.

Figure 2:
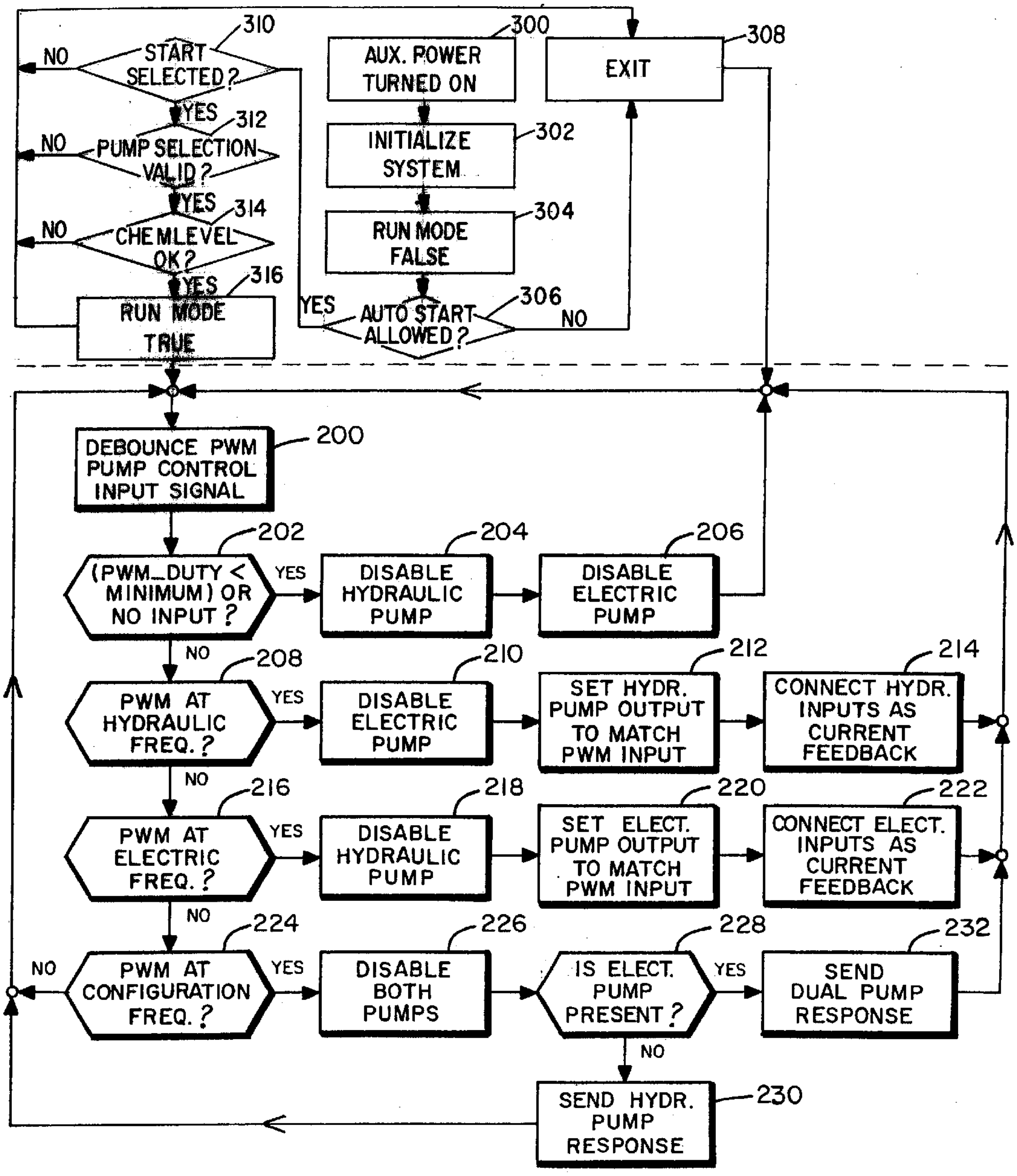
FIG. 2 is a software flow diagram showing how the auto start feature of the present invention is added a foam injecting system of the prior art.

As reflected by the flow diagram of FIG. 2, when the auxiliary power panel is turned on (block 300), the system is initialized as represented by block 302. The initialization step performs necessary pre-start housekeeping to assure that all outputs are "safe". Initialization also establishes controller integrity. Once this has occurred, the RunMode is set false (block 304). A test is then made at decision block 306 to determine whether the microprocessor-based controller used in the system permits the AutoStart operation and if not, the routine ends at that point and the system can only be turned on by manual actuation of the on/off control pushbutton 32 on the controller module 26.

If AutoStart is provided for, a test is made at decision block 310 to determine whether the microprocessor-based controller has been programmed to operate in the AutoStart mode. More particularly, a bit in a control register is examined to determine if it is set or cleared and if set, a further test is made at decision block 312 as to whether the pump selection is valid. If the test at decision block 310 had indicated that the control bit in the register used to indicate whether AutoStart operation was programmed for was cleared, the routine would be exited (block 308) and, again, manual actuation would be needed to activate the foam injection system. Using the system "set-up mode", the system can be configured so that the AutoStart is the default mode for the system. This selection is thus retained through any power outages or unintended actuation of the "on/off" switch.

The test at decision block 312 takes into account that the system can have a hydraulic motor-driven foam injection pump, an electric foam injection pump or both. The pump selection valid test insures that if a hydraulic pump is selected, it is functional and running.

Assuming that the pump selection is valid, a check is next made at decision block 314 to determine whether an adequate amount of foam concentrate is present in the foam tank. Basically, there is a float-type sensor in the foam tank that provides a signal to the microprocessor-based controller 26 and/or the hydraulic valve driver 100 and this sensor must indicate the presence of a predetermined volume before the RunMode can be enabled (block 316). When the RunMode enabled, the software algorithm depicted by the portion of FIG. 2 below the horizontal dashed line will execute, thereby controlling the introduction of the liquid chemical foamant into the waterstream in a way that maintains the concentration of the foamant in the water at a preset level.

If the system is operating in the AutoStart mode and an operator should push the on/off button 32, it will turn the foam system off. Thus, an operator can override the AutoStart mode. If once again the operator should push that on/off pushbutton, the foam system will again come on. In simple terms, then, the running of the AutoStart software effectively acts as if it were actuating the "on" button for the foam system when predetermined conditions prevail.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. In a fire fighting vehicle, a system for introducing a liquid foam concentrate into a water stream in varying amounts to maintain a predetermined percentage mixture, irrespective of variations in water flow rates, said vehicle including a source of electrical power, a water pump for delivering raw water through a delivery hose, a foam pump for delivering liquid foam concentrate from a supply tank into said delivery hose to be mixed with the raw water, a motor connected in driving relation to the foam pump and a microprocessor-based controller adapted to be energized from the source of electrical power and coupled in controlling relation to said motor for controlling the fluid flow output rate of the foam pump, the improvement comprising:

(a) means activated upon application of electrical power from said source to the microprocessor-based controller for conditioning the system to introduce the liquid foam concentrate into the water stream by the foam pump upon detection of raw water flow in the delivery hose.

2. The fire fighting vehicle of claim 1 wherein the foam pump is driven by one or both of an electric motor and a hydraulic motor.

3. The fire fighting vehicle as in claim 2 wherein the microprocessor-based controller must determine the presence of a selected one or combination of the electric and hydraulic drive motors and a satisfactory level of liquid foam concentrate in the supply tank to activate the selected drive motors upon detection of water flow in the delivery hose.

4. The system as in claim 1 wherein the means for conditioning the system comprises:

(a) means for sensing whether an automatic start mode is selected;

(b) means for maintaining the automatic start mode in the event of power loss; and (c) means for determining that the level of liquid chemical foam concentrate in the supply tank is above a predetermined level.

5. The system as in claim 4 wherein the means for conditioning the system further comprises:

(a) means for detecting whether the motor connected to the foam pump is an electric motor or a hydraulic motor.

* * * * *